A. T. PETERSEN.
POWER TRANSMITTING AND DRAFT CONNECTION.
APPLICATION FILED JAN. 25, 1918.
1,322,335.
Patented Nov. 18, 1919.
2 SHEETS—SHEET 1.
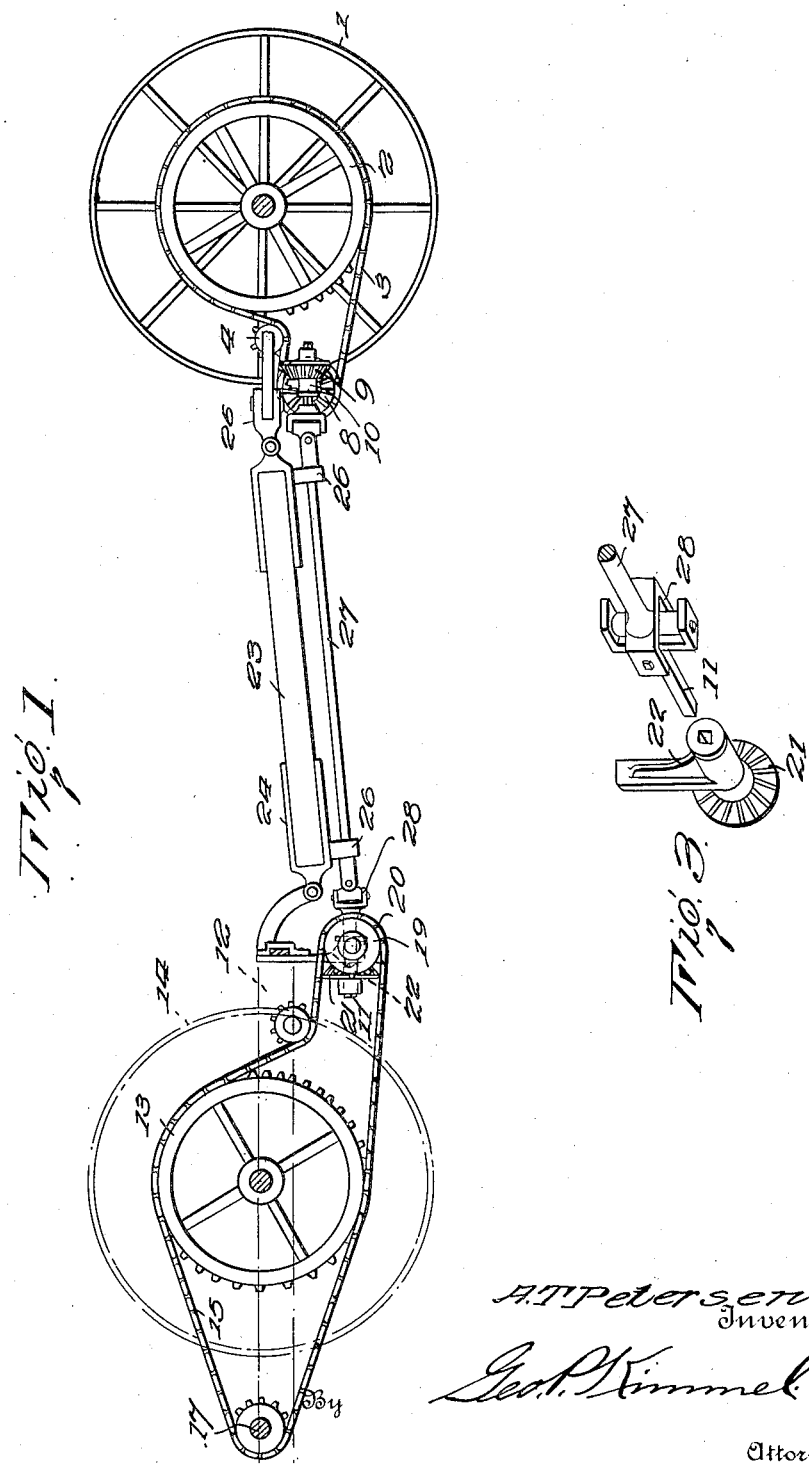

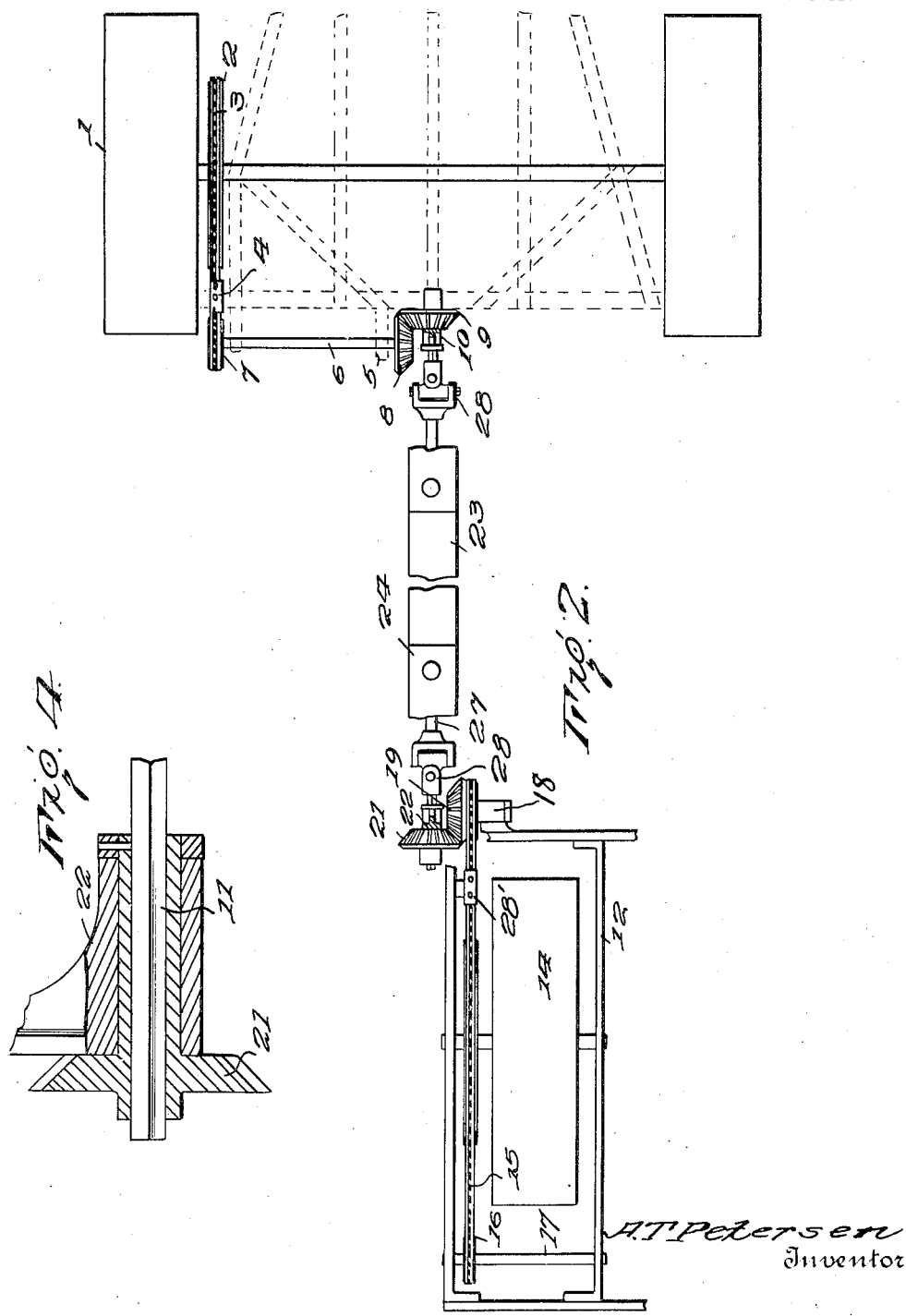

UNITED STATES PATENT OFFICE.

ALVY T. PETERSEN, OF EDMONTON, ALBERTA, CANADA.

POWER-TRANSMITTING AND DRAFT CONNECTION.

1,322,335.   Specification of Letters Patent.   Patented Nov. 18, 1919.

Application filed January 25, 1918. Serial No. 213,736.

*To all whom it may concern:*

Be it known that I, ALVY T. PETERSEN, a citizen of the United States, residing at Edmonton, in the Province of Alberta, Canada, have invented certain new and useful Improvements in Power - Transmitting and Draft Connections, of which the following is a specification.

This invention relates to power transmitting devices and the invention has more especial reference to an improved power transmitting and connecting device especially designed for use in conjunction with agricultural machines.

The invention has for its dominant object to provide a device for effecting a draft connection and power transmission between a binding or other agricultural machine and a tractor, whereby the operation of the working mechanism of the machine and the travel of the same over a field will be at all times insured.

Another and equally important object of the invention is to provide a novel form of compensating means for the device whereby relative movement of the machine and the tractor will be permitted without interruption of the transmission of power, such as may be caused by the travel of the machine or tractor over rough or uneven ground.

Other independent objects are to provide features of construction of portions of the device which tend toward the attainment of the above aims irrespective of the relation in which they are used.

Other objects will be in part obvious and in part pointed out hereinafter.

The invention accordingly consists in the features of construction, combination of elements, and arrangement of parts which will be exemplified in the construction hereinafter set forth, and the scope of the application of which will be indicated in the following claims.

In the accompanying drawings, wherein is shown one of various possible embodiments of my invention:—

Figure 1 is a side elevation of the improved connection and power transmission device engaged with a fragment of a tractor and a fragment of a binder.

Fig. 2 is a top plan thereof having parts broken away.

Fig. 3 is a disassembled perspective of the power transmission connection, and

Fig. 4 is a section through a portion of the same.

Similar reference characters refer to similar parts throughout the several views of the drawings.

Having more particular reference to the drawings, 1 represents the rear end of a tractor in its entirety, one of the wheels of the same having a sprocket wheel 2 secured to the inner side thereof and receiving a sprocket chain 3 thereover, the upper portion of the chain being engaged by an idler 4 supported on suitable bearings on the tractor 1.

Mounted in bearings 5 on the rear end of the tractor and arranged substantially parallel to the same is a shaft 6 carrying a sprocket wheel 7 on one end thereof, which sprocket wheel receives the remaining end of the chain 3 thereabout, while the other end of the shaft 6 is provided with a beveled gear 8 which in turn, meshes with a similar gear 9 supported in bearings 10 on the tractor and slidably receiving a squared shaft 11 therein, the purpose of which will be presently described.

A binder or other agricultural implement fragmentarily shown and designated in its entirety by the numeral 12 is arranged rearwardly of the tractor and has a sprocket wheel 13 connected to the bull wheel 14 of the same, which sprocket wheel receives a chain 15 thereover, the rear end of the chain passing about a sprocket wheel 16 mounted on a shaft 17 connected to and adapted to drive the working mechanism of the binder. A bearing 18 is formed on the forward end of the binder frame and receives a beveled gear 19 therein, the said gear being provided with a sprocket wheel 20 receiving the forward end of the chain 15 thereabout. As will be noted, the beveled gear 19 normally meshes with a similar gear 21 mounted in bearings 22 secured to the binder frame and receiving a squared shaft similar to the shaft 11 hereinbefore mentioned. The slidable connection between the squared shaft section 11 and the squared longitudinal bores in the rotatable stub-shaft which supports the gears 9 and 21 respectively, compensates for the unevenness of the ground over which the machines travel and in addition provides an easy means of disconnecting the connecting shafts from either the binder or tractor.

As means for effecting a draft connection between the tractor and binder, a bar 23 is employed and carries brackets 24 upon its opposite ends, which brackets are pivotally engaged with corresponding brackets 25 secured to the rear end of the tractor 1 and the forward end of the binder 12.

Bearing brackets 26 are carried upon the under sides of the brackets 24 and support therein a power transmitting shaft 27, the opposite ends of which are connected by universal joints 28 to the squared shafts engaged with the beveled gears 9 and 21. In this way, it will be readily understood that an efficient driving connection between the tractor driving means and the operating mechanism of the binder is afforded. Hence, the operation of the working mechanism of the binder is at all times insured.

To insure proper connection of the sprocket chain 15 with the sprocket wheel 13, an idler 28', similar to the idler 4 is mounted on the binder frame and engaged with the upper portion of said chain 15.

By means of my improved draft and driving connection, I am enabled to provide means for drawing binders over a field and also for causing the operation of the working mechanism of the same. The necessity for the assistance in driving the working mechanism of a binder and like agricultural machines arises out of conditions which are peculiar to various locations where crops are often to be cut under exceedingly unfavorable climatic conditions, under which a binder cannot be reasonably expected to properly function. The chief trouble is usually experienced with the combination of damp, tough straw and slippery ground, which will invariably cause the main drive wheel or bull wheel of the binder to slide or slip, thereby preventing the transmission of power to the working mechanism of the binder and hence, preventing functioning of the same. With my improvement, this difficulty is overcome.

The device due to its simple construction may be attached to practically any form of binder or agricultural machine now marketed with but little if any alteration to the same.

Manifestly, the construction shown is capable of considerable modification and such modification as is within the scope of my claims, I consider within the spirit of my invention.

I claim:

1. In a device of the character described, the combination with a tractor and a machine to be drawn and operated thereby, of a rigid connection pivotally engaged with the said tractor and machine, a main shaft carried by and extending longitudinally of the connection, power transmitting gearing including gear carrying stub-shafts rotatably mounted on the tractor and on the machine and having square longitudinally extending bores therethrough, and square shaft sections universally connected with the opposite end of said main shaft and slidably engaged with the square bores of said gear carrying stub-shafts.

2. In a device of the character described, the combination with a tractor and a machine drawn and operated thereby, of a rigid bar, brackets carried at the ends of the bar, other brackets carried by the tractor and the machine and pivotally engaged with the adjacent brackets on the bar, bearing brackets depending from the bar, a main shaft section journaled in the bearing brackets and arranged longitudinally beneath the bar, power transmitting gearing including bearing brackets carried by the tractor and the machine, gear carrying stub-shafts journaled in the last mentioned brackets and provided with square longitudinally extending bores, and shaft sections square in cross section having their inner ends universally connected to the opposite ends of the main shaft section on the bar and their main portions slidably engaged with the square bores of said gear carrying stub-shafts to compensate for relative movement of the tractor and machine.

In testimony whereof, I affix my signature hereto.

ALVY T. PETERSEN.